Patented Jan. 18, 1949

2,459,209

UNITED STATES PATENT OFFICE 2,459,209

METHOD OF TREATING VITREOUS FUSED SILICA

Theodore K. Zagwyn, Waltham, and Peter R. Kosting, Belmont, Mass.

No Drawing. Application May 28, 1945, Serial No. 596,253

5 Claims. (Cl. 49—78.1)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a method for improving the physical properties of the shaped vitreous (glass) products or articles obtained by wholly or completely fusing or melting particles or masses of high purity silica (e. g. glass sand), or rock crystal (quartz), followed by cooling of the liquid or semi-liquid mass to solidify it, and accompanied by suitable shaping operations to bring the liquid or semi-liquid mass into the desired shape or shapes.

There is considerable confusion in the nomenclature relating to the vitreous fused silica products or articles obtained as above described. The products referred to above are essentially silica glass, consisting throughout their bodies or masses of non-crystalline solidified fused high purity silica ($SiO_2$) of some form. These products have frequently been referred to as "fused quartz" or "quartz glass" or simply as "quartz." The word, "quartz," for many years in the past has been used to denote the crystalline material "rock crystal" and distorting its meaning to refer to a non-crystalline material promotes confusion.

In the interest of clarity, the term "vitreous fused silica" is used herein to denote the solid vitreous non-crystalline, glassy, products obtained by cooling to solidification fully or wholly fused silica. This term is intended to exclude fine particles or small masses of silica, or rock crystal, sintered together without complete fusion of the particles. Thus, in "vitreous fused silica" as used herein all portions of the silica composing the products or articles have passed through a fused or molten condition in the preparation or manufacture of the products made thereof.

Vitreous fused silica shaped products may have different appearances as regards transmitted and reflected light. There are transparent, translucent and opaque varieties of vitreous fused silica. The transparent variety of vitreous fused silica is usually made by the fusion of rock crysstal (quartz) and therefore may be designated correctly as "fused quartz." The translucent and opaque varieties of vitreous fused silica are usually obtained by fusion of extreme purity glass sand ($SiO_2$) and are further designated as "sand surface," "satin surface" or "glazed," according to the finish produced in manufacture.

Thus, the term "vitreous fused silica" used herein is generic and includes transparent, translucent and opaque products made by fusion of silica in any form, whether the original starting material was crystalline or non-crystalline, quartz or glass sand. The expression or term "sand surface vitreous fused silica" and "satin surface vitreous fused silica" are used herein to denote forms of opaque and translucent vitreous silica having respectively a sandy or satin exterior surface appearance. The "sand surface vitreous fused silica" usually has a sandy exterior surface resembling fine white sandstone. The sand surface vitreous fused silica and the satin surface vitreous fused silica are, despite the appearance of their exterior surface thoroughly vitreous in structure.

The fusion or melting of silica ($SiO_2$) hereinbefore mentioned is accomplished in the absence, or without the use, of fluxes, and the heating to accomplish fusion may be done electrically or otherwise. Vitreous fused silica shaped products as herein defined appear on the market under the trade name or mark "Vitreosil" and products bearing such trade designation may be purchased from The Thermal Syndicate, Limited, Brooklyn, New York, and Wallsend-on-Tyne, England.

Among the objects of the present invention is the provision of a method or process for increasing the structural strength of shaped vitreous fused silica products or articles under elevated temperature conditions, particularly vitreous fused silica tubes closed at one end by an integral wall of vitreous fused silica.

The invention finds distinct application in connection with vitreous fused silica radiation tubes used in contact with fluid masses at high temperature, for example liquid masses of molten iron or steel.

Tubes of sand surface vitreous fused silica (as defined above), having one end closed with a wall of vitreous fused silica integral with the cylindrical wall of the tube, have long been used as a radiation source for the measurement of temperatures of high temperature fluid masses. For example, in the determination of the temperature of molten steel, which generally ranges from 2800° F. to 3100° F., the closed end of a vitreous fused silica tube is inserted in the molten steel to an appreciable depth. The vitreous fused silica tube rapidly assumes the temperature of the steel and begins to act as an approximate black body radiator. The radiation passing out of the open end of the vitreous silica tube is picked up by any suitable or known optical system and is analyzed by suitable or known measuring apparatus to thereby measure the temperature of the molten steel.

It has been observed that such vitreous fused silica tubes do not give satisfactory prolonged service when utilized in the measurements of the temperature of high temperature fluid masses, particularly steel, wherein the temperature exceeds 2700° F. Under such conditions the vitreous fused silica tubes were found to fail after one or two immersions due to collapse of the walls of the tubes or by the appearance of localized holes in the tubes. The present invention overcomes these objections and provides vitreous fused silica closed end tubes having a greatly increased immersion life when immersed in high temperature molten materials such as molten steel or iron. The vitreous fused silica radiation tubes obtained according to the present invention have greatly increased structural strength and resistance to deterioration under exposure to high temperatures in comparison with vitreous fused silica tubes which have not been treated or processed according to the present invention.

According to the present invention the vitreous fused silica radiation tube, or other article, whose structural strength and resistance to deterioration under exposure to high temperatures of molten metals are desired to be increased, is subjected to a special heat treatment prior to exposure to, or contact with the molten metal, such as molten steel. This preliminary heat treatment consists in raising the temperature of the vitreous fused silica radiation tube or article to a point within the range of 2500° F. to 2750° F. and holding the vitreous fused silica tube or article at such a temperature for a period of time in excess of five minutes, for example from five to thirty minutes. The so heated tube or article is then allowed to cool to a temperature below 2500° F. The rate or extent of cooling after the heating described is relatively immaterial and the vitreous fused silica may be air-cooled to any desired temperature below 2500° F. before being subjected to the molten metal or other high temperature conditions. It has been found that best results are obtained for radiation tubes by a preliminary heat treatment as described at approximately 2600° F. for fifteen minutes and thereafter permitting the tube to cool to a temperature in the neighborhood of, or approximately of, 1800° F. prior to immersion in molten steel having temperatures above 2800° F.

Vitreous fused silica radiation tubes treated according to the method of the invention described above will be found to have an immersion life, as regards molten steel, increased up to twenty times the number of immersions possible for a similar or like tube which has not received the heat treatment according to the present invention. This increased immersion life is obtained even when the vitreous fused silica radiation tubes are used for the temperature measurements of molten steel at, or near, a temperature of 3100° F. The increase in structural strength or immersion life of the vitreous fused silica radiation tubes treated according to the invention appears to be connected with the phenomenon of devitrification of the vitreous fused silica started or occasioned by the heat treatment according to the invention.

This application is a continuation-in-part of our copending application Ser. No. 445,986, filed June 5, 1942, now abandoned.

The term or expression "vitreous fused silica" appearing in the appended claims has the meaning described or defined in the earlier parts of this description. Other terms appearing in the claims and defined in this description, are to be given the defined meaning as far as the context of the claims permits. The definition of terms used, as explained in earlier parts of this description, is necessary in view of the confusion or inconsistencies existing in the nomenclature relating to products or articles obtained by fusion of silica or glass sand on the one hand and fusion of rock crystal (quartz) on the other.

We claim:

1. The method of improving the structural strength of a shaped vitreous fused silica article under high temperature conditions particularly at or about 2800° F. or above, which comprises, prior to subjecting it to said conditions, raising its temperature to a point within the range of 2500° F. to 2750° F. for a period of time in excess of five minutes and thereafter cooling it to a temperature below 2500° F.

2. The method of improving the structural strength of a shaped vitreous fused silica article under high temperature conditions particularly at or about 2800° F. or above, which comprises, prior to subjecting it to said conditions, raising its temperature to a point within the range of 2500° F. to 2750° F. for a period of time or from five to thirty minutes and thereafter cooling it to a temperature below 2500° F.

3. The method of improving the structural strength of a vitreous fused silica radiation tube under high temperature conditions, which comprises, prior to subjecting it to said conditions, raising its temperature to a point within the range of 2500° F. to 2750° F. for a period of time of from five to thirty minutes and thereafter cooling the tube to a temperature of approximately 1800° F.

4. The method of improving the structural strength of a sand surface vitreous fused silica radiation tube under high temperature conditions particularly at or about 2800° F. or above, which comprises, prior to subjecting it to said conditions, raising its temperature to a point within the range of 2500° F. to 2750° F. for a period of time of from five to thirty minutes and thereafter cooling it to a temperature in the neighborhood of 1800° F.

5. The method of improving the structural strength of a sand surface vitreous fused sicila radiation tube under high temperature conditions particularly at or about 2800° F. or above, which comprises, prior to subjecting it to said conditions, raising its temperature to approximately 2600° F. for about fifteen minutes and thereafter cooling it to a temperature in the neighborhood of 1800° F.

THEODORE K. ZAGWYN.
PETER R. KOSTING.

REFERENCES CITED

The following references are of record in the file of this patent:

UNITED STATES PATENTS

| Number | Name | Date |
|---|---|---|
| 1,628,468 | Miller | May 10, 1927 |
| 2,270,718 | Skaupy | Jan. 20, 1942 |